United States Patent Office 3,397,999
Patented Aug. 20, 1968

3,397,999
PROCESS FOR HOLDING OLIVES
BEFORE PROCESSING
Rudolf A. Kellerman, San Francisco, Calif., assignor to V. R. Smith Olive Company, Inc., Lindsay, Calif., a corporation of California
No Drawing. Filed Dec. 21, 1964, Ser. No. 420,143
3 Claims. (Cl. 99—156)

ABSTRACT OF THE DISCLOSURE

Olives preserved prior to canning by placing them in an aqueous, brine-free solution containing about 0.1% to 0.3%, by weight, of phosphoric acid.

---

This invention relates to an improved process for holding olives from the time they have been picked and received at the plant, until they are processed.

Few, if any, commercial olive processing plants have sufficient vats to process the olives as rapidly as they are brought in from the orchards, and it is the normal procedure for the olives to be held for different lengths of time up to one year, and even longer. Heretofore, the olives have always been held in brine having approximately 5% to 10% salt, the concentration being progressively built up from approximately a 5% solution, where the olives are to be held, for approximately one week, to said 10% by steps of approximately 2 points per week. Usually the olives are held in a 7% to 10% salt solution for a matter of months, and while holding the olives in the brine for a relatively short period of time has been considered helpful in improving the texture of the fruit and in shortening the pickling or processing time, it is known that certain chemical changes take place in the olives that have held beyond a relatively short predetermined time, and they deteriorate. The brine tends to burn the life out of the olives, detrimentally affecting the texture, color and flavor.

One of the objects of this invention is the provision of an improved process, and an improved holding solution that overcomes the above objection. Olives held in the solution defined hereafter do not deteriorate for an indeterminate length of time in any respect, and are as rapidly processed as where brine is used as the holding medium.

Another problem that has existed since the advent of canning olives commercially, is the disposal of the brine. The brine is renewed periodically and in commercial olive processing plants, the amount of brine accumulating for disposal and so disposed of, is so great as to pollute the rivers, canals, underground water sources, and large areas of soil to the extent that laws have been passed regulating the disposal. In some districts the restrictions on the disposal of the brine have become so severe as to jeopardize the olive industry in such districts, since it is economically prohibitive to desalt the water or to line storage ponds, etc., to prevent leakage into the soil.

One of the objects of this invention is the provision of a process and also the provision of a holding solution, that overcomes the problem of disposal, in that the solution may pass into the soil and into rivers, underground water sources, canals, etc., without objection and with actual possible benefit.

Other objects and advantages may appear in the detailed description.

In the present instance, the olives are placed in a holding solution comprising an aqueous phosphoric acid solution containing from approximately 0.1% phosphoric acid ($H_3PO_4$), up to approximately 0.3% phosphoric acid, with or without the addition of potassium sorbate or other preservatives or antifungicidal agents.

The foregoing solution should be kept at a pH of preferably about 3.5 to 4, and below 4.8, and where potassium sorbate is used as a safeguard to keep the acid solutions free of mold, the potassium sorbate will be changed into sorbic acid in the solution, which would raise the pH of the solution, and phosphoric acid would be added to bring the pH to the desired standard mentioned. Sorbic acid is an active fungus inhibitor and the sorbate is used mainly because of its better solubility in the solution.

Insofar as the entire olive treating process is concerned, the present invention is applicable to both green and ripe olives. There is no change in the conventional handling and treatment of olives up to the time they are placed in the holding solution and after being taken out of the holding solution.

As has already been noted, the use of the present process and solution in the treatment of olives (both green and ripe), in addition to preserving the olives during the holding period, makes them substantially more resistant to changes in color and texture, and improves their flavor characteristics by maintaining the tang that is highly desirable, but which is usually lost or reduced during normal holding periods, where brine is used as a holding solution.

The present invention should not be confused with conventional acidified brine solutions, such as where brine has been acidified by addition of lactic or acetic acid to check the growth of putrefactive bacteria during the early period in the holding solution, or when the salt content of the brine is too low, or when the normal development of lactic acid is insufficient.

Applicant's process avoids the necessity for considering the above problems that are ever present where the conventional brine holding solution is employed, since it is only necessary to provide the phosphoric acid solution as described, and to store the olives in such solution until ready for further treatment.

It has been mentioned that the use of the brine solution presents a most serious problem as to its disposal. Where a phosphoric acid solution as herein described is used by the addition of ammonium hydroxide to the solution after the olives have been removed, ammonia phosphate is produced in the solution, so that what otherwise would have been a waste solution, is usable as a beneficial fertilizer for the soil.

I claim:
1. The process of holding olives between the time they have been picked and the time they are processed for canning, which comprises placing said olives in an aqueous, brine free solution containing approximately 0.1% to 0.3%, by weight, of phosphoric acid.
2. The process as defined in claim 1 in which said phosphoric acid does not substantially exceed 0.3% by weight.
3. The process of pickling and canning green or ripe whole olives that includes the steps of;
   (a) holding the olives substantially immediately after picking for an indeterminate period of time in a brine-free aqueous solution containing approximately 0.1% to approximately 0.3% by weight of phosphoric acid at a pH of below 4.8 and thereafter,
   (b) removing said olives from said solution pickling them and subsequently canning the resultant product.

References Cited
UNITED STATES PATENTS 3,085,881   4/1963   Ball _____ 99—156
3,002,839   10/1961  Levinson et al.

RAYMOND N. JONES, *Primary Examiner.*

M. VOET, *Assistant Examiner.*